United States Patent
Brown

[15] 3,653,573
[45] Apr. 4, 1972

[54] CASING CENTRALIZER AND MANDREL FOR USE IN WELDING LARGE DIAMETER CASING

[72] Inventor: Cicero C. Brown, c/o Brown Oil Tools, Inc. P. O. Box 19236, Houston, Tex. 77024

[22] Filed: Oct. 3, 1968

[21] Appl. No.: 764,787

[52] U.S. Cl. ..................228/5, 219/60, 228/44, 228/50, 269/104, 285/96
[51] Int. Cl. ..................B23k 1/20
[58] Field of Search ..................228/5, 44, 46, 50; 219/60; 269/104; 73/49.5, 49.6; 285/96

[56] References Cited

UNITED STATES PATENTS

| | | | |
|---|---|---|---|
| 2,167,896 | 8/1939 | Graham et al. | 228/50 |
| 2,594,000 | 4/1952 | Elliot | 228/50 |
| 3,261,529 | 7/1966 | Pagan | 228/50 |
| 3,369,725 | 2/1968 | Thomas et al. | 228/50 |
| 3,387,761 | 6/1968 | Pickard | 228/42 |
| 3,458,105 | 7/1969 | Valentine | 228/44 |
| 3,461,264 | 8/1969 | Nelson et al. | 219/60 |
| 3,462,059 | 8/1969 | Bauer et al. | 228/5 |
| 3,498,518 | 3/1970 | Wheeler et al. | 228/50 |

Primary Examiner—John F. Campbell
Assistant Examiner—Robert J. Craig
Attorney—R. Werlin

[57] ABSTRACT

A tool for use in welding together large diameter casing sections, particularly in forming liners for deep earth bores. The tool includes fluid pressure actuated expander assemblies operative to align the casing sections, assure concentricity of the sections at the weld joint, and to position an expansible chill ring opposite the weld joint. The tool also includes elements enabling pressure testing the welds, and hydraulic jacking means for moving the tool longitudinally of the casing.

10 Claims, 18 Drawing Figures

Fig. 2

Patented April 4, 1972

CICERO C. BROWN
INVENTOR.

BY

ATTORNEY

CICERO C. BROWN
INVENTOR.

BY

ATTORNEY

CASING CENTRALIZER AND MANDREL FOR USE IN WELDING LARGE DIAMETER CASING

Large diameter bore holes are currently being drilled to great depths in the earth for various purposes, such as for mine shafts and more particularly for placement of nuclear explosives in connection with tests conducted by the Atomic Energy Commission. Such bore holes will often include sections of from 5 to 6 feet in diameter and extending vertically into the earth to depths of 5,000 feet or more. To seal off the bore walls against entrance of formation fluids and to support them against cavity, steel casing must be run into the bore hole as a liner.

Such liners are preferably formed by welding successive sections of the pipe to the upper end of the casing string as it is inserted into the bore hole. The very large diameters and bulk and mass of the casing create difficult problems in accurately aligning the vertically suspended added sections with the upper end of the casing in place in the bore hole for purposes of welding the sections. This difficulty is accentuated by the fact that such large diameter pipe sections are frequently out-of-round, so that it becomes very difficult to attain the requisite coaxial alignment and concentricity of the abutting ends of the sections which form the joint to be welded to assure a leak-tight weld. Also, pressure testing of the welds in place in the bore holes as they are completed is another source of great difficulty under current practices.

It is a primary object, therefore, of the present invention to provide a tool for use in welding large diameter casing sections, which obviates difficulties such as those enumerated above, by providing a structure by which the pipe ends to be joined are coaxially aligned, shaped to substantially full roundness, and are disposed in flush relation to enable accurate and tight welding.

Another object is the provision in a tool of the kind described of elements for pressure testing the welds as they are completed, and of hydraulic jack means for moving the tool longitudinally of the casing without requiring external hoisting equipment and for positioning the pressure testing elements in proper relation to the welds.

The tool, in accordance with one embodiment of this invention, comprises a tubular support or mandrel, which carries longitudinally spaced upper and lower aligning assemblies. Each of these aligning assemblies includes a plurality of fluid pressure-actuated, radially extensible and retractible shoes or slips, having substantially smooth faces adapted to press outwardly against the casing sections as to cause the ends thereof to assume a substantially true cylindrical shape, and to coaxially align the casing ends.

The longitudinal spacing of the assemblies is such that the upper assembly engages the casing section on one side of the joint, and the lower assembly includes slips having a length such as to span the joint between the sections so as to engage the immediately adjacent end portions of both pipe sections defining the joint. The latter assembly includes a circumferentially expansible segmented chill ring constructed of copper or the like, supported about the faces of the slips and disposed for registration with the joint being welded. The chill ring functions to prevent bonding of the weld to the tool.

A first anchor assembly is mounted to the lower end of the tool and includes fluid pressure actuated, radially extensible and retractible pipe-gripping slips for anchoring the tool in the down-hole casing section for locating the tool in operative position relative to the joint to be welded.

For pressure testing the welds, the tool, as illustrated, has mounted below the first anchor assembly a tubular testing extension carrying longitudinally spaced annular seals adapted to seal off between the tool and the casing at points above and below the weld to permit application of fluid pressure thereto. A second anchor assembly is carried by the lower end of the testing extension and includes a plurality of fluid pressure-actuated, radially extensible and retractible pipe-gripping slips for engagement with the casing wall. The two anchor assemblies are inter-connected by means enabling them to function as hydraulic jacks by which the entire tool may be raised and lowered in the casing as required for effectively positioning the tool therein, without requiring the use of heavy duty external hoisting equipment.

The tool includes fluid pressure operated means for selectively actuating the several aligning, anchoring and testing assemblies in appropriate order, as required.

Various other objects and advantages of this invention will become evident from the following detailed description when read in conjunction with the accompanying drawing which illustrates a useful embodiment in accordance with this invention.

Referring to the drawing, the tool comprises a tubular support member or body 10, having an axial bore 11. Mounted about the exterior of body 10, moving downwardly from its upper end, or an upper aligning assembly, designated generally by the letter A, a lower aligning assembly, designated generally by the letter B, a first anchor turn, designated generally by the letter C, a pressure testing assembly, designated generally by the letter D, and a second anchor assembly designated generally by the letter E.

The upper end of body 10 is covered by a cap 12 on the center of which is mounted a shouldered hoisting neck 13, designed to be releasably grasped by an overshot or gripping tool 14, of a generally conventional design, which is suspended on a cable 15 attached to a block 16 which is, in turn, supported on a hoisting frame 17 adapted to be raised and lowered by any conventional hoisting means, not shown, but preferably hydraulic jack means, because of the great weights which may be involved.

Figures 3, 4:
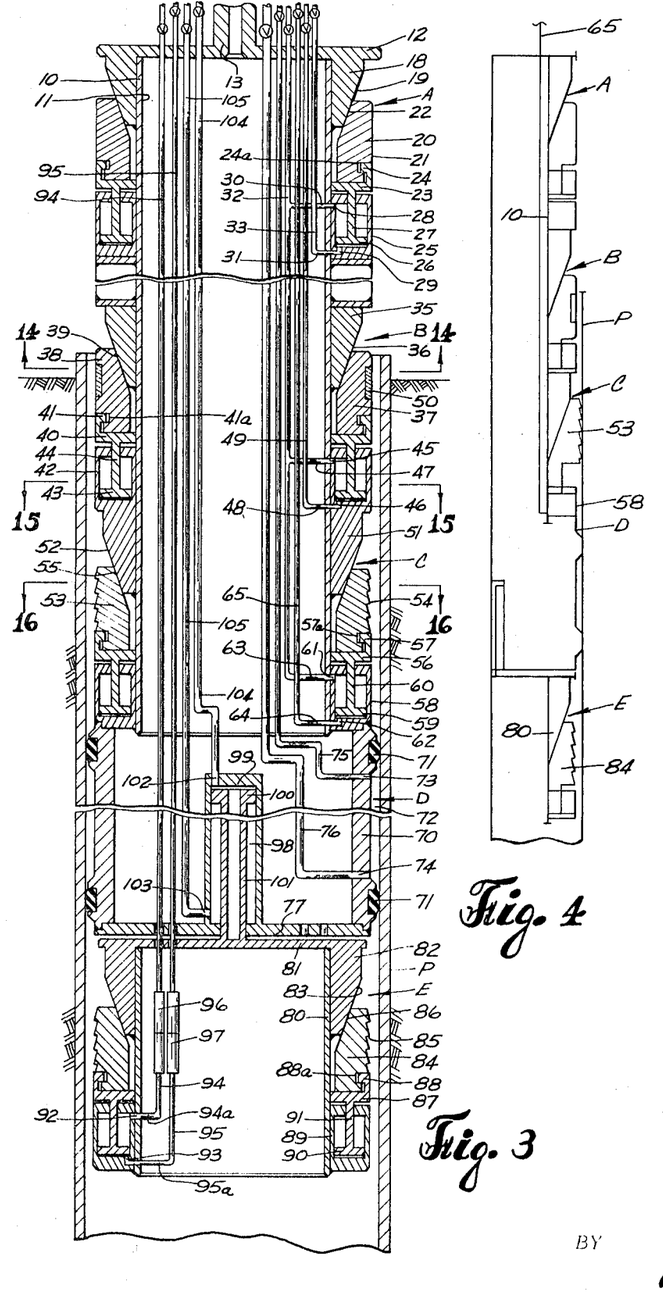
FIG. 3 is a longitudinal, cross-sectional view of the tool in the position shown in FIG. 1 and showing the several pipe connections for supplying actuating pressure fluid to the several fluid pressure-actuated elements of the tool.
FIGS. 4 to 13, inclusive, are fragmentary generally diagrammatic views, partly in section, illustrating the positions of the principal parts at various stages in the operation of the tool.

As best seen in FIG. 3, aligning assembly A includes an expander 18 secured about the upper end of body 10 and having a downwardly and inwardly tapering, conical surface 19, about which is arranged a plurality of angularly spaced slips 20 having generally smooth external faces 21 defining cylindrical segments and having tapering inner faces 22 cooperating with expander surface 19 to produce radial extension and retraction of the slips in response to longitudinal movement thereof relative to expander 18.

The set of slips 20 is mounted for limited radial movement in an annular cage 23 provided with an inwardly turned retainer lip 24 receivable in cooperating grooves 24a in the slip shanks for connecting the slips to the cage while cooperating with the slips to permit the necessary degree of radial movement thereof. A plurality of angularly spaced vertically disposed cylinders 25 are fixedly mounted about the exterior of body 10 beneath cage 23, each cylinder being provided with a piston 26 attached to a piston rod 27 which extends through the upper end of the cylinder and is secured to cage 23. With this arrangement it will be evident that reciprocation of the pistons will raise and lower cage 23 whereby to move the set of slips 20 into and out of expansive engagement with expander 18.

Each of the cylinders 25 is provided with upper and lower ports 28 and 29, respectively, on opposite sides of piston 26 to function alternately as inlets and outlets for pressure fluids supplied through related header branch pipes 30 and 31, respectively, which, in turn, connect to valved conduits 32 and 33, respectively, suitably arranged in bore 11 and extending to the exterior thereof through cap 12.

Lower aligning assembly B includes an annular expander 35 secured about the exterior of body 10 below expander assembly A and having a downwardly and inwardly tapering, generally conical surface 36. A plurality of angularly spaced slips 37 is arranged about expander 35. Slips 37, which are substantially longer than slips 20, have generally smooth external faces 38, defining generally cylindrical segments, and have tapering inner faces 39 cooperating with expander surface 36 to produce radial extension and retraction of the slips in response to longitudinal movement thereof relative to expander 35.

As in the case of aligning assembly A, slips 37 are mounted for limited radial movement in an annular cage 40 provided with an inwardly turned retainer lip 41 receivable in grooves 41a for connecting the slips to the cage while cooperating with the slips to permit the necessary extent of radial movement thereof.

A plurality of angularly spaced vertically disposed cylinders 42, like cylinders 25, are fixedly mounted about the exterior of body 10 beneath cage 40, each cylinder being provided with a piston 43 attached to a piston rod 44 which extends through the upper end of cylinder 42 and is secured to cage 40. Reciprocation of pistons 43 will raise and lower cage 40 whereby to move slips 37 into and out of expansive engagement with expander 35.

Each of the cylinders 42 is provided with upper and lower ports 45 and 46, respectively, on opposite sides of piston 43, to function alternately as inlets and outlets for pressure fluids supplied through respective header branch pipes 47 and 48. Branch pipes 47 are connected to conduit 32, while branch pipes 48 are connected to a valved conduit 49 disposed in bore 11 and extending to the exterior thereof through cap 12.

Figures 14, 14A, 15, 16, 17:
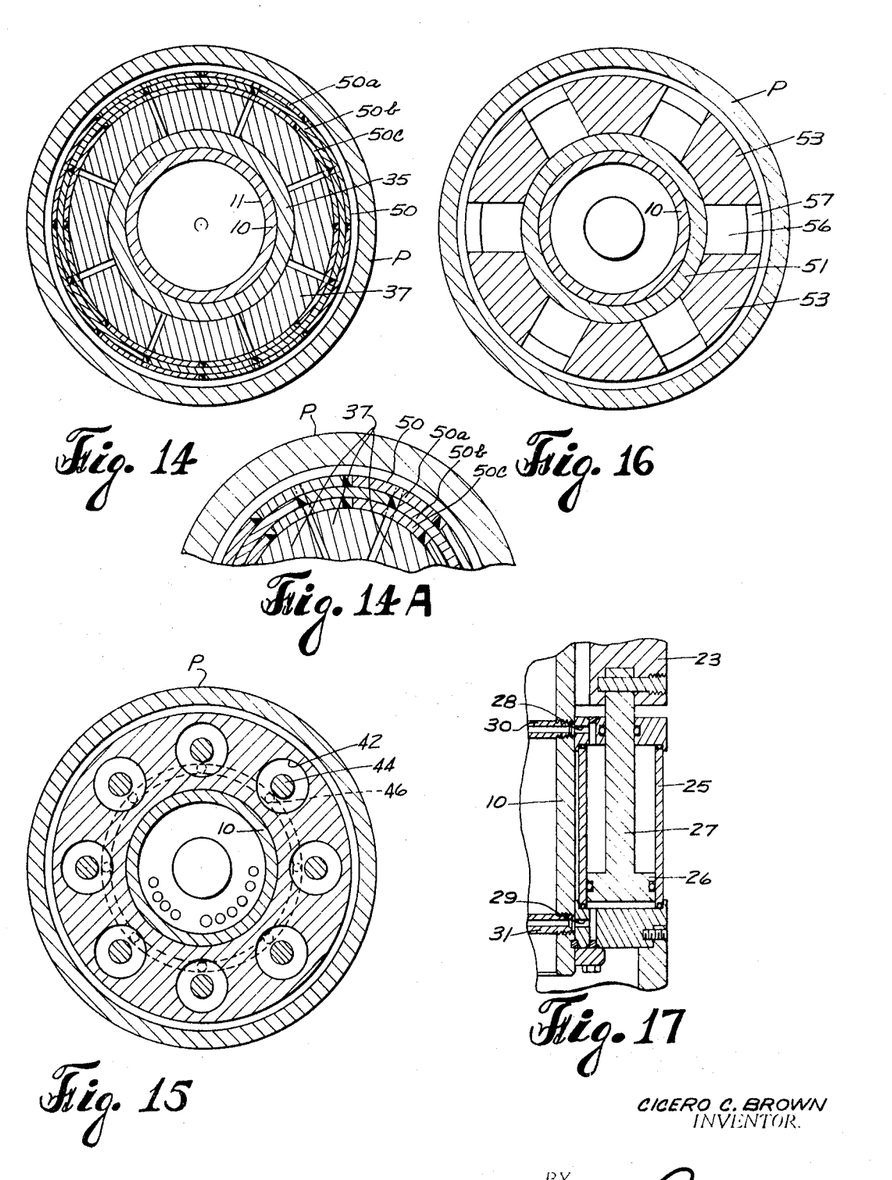
FIG. 14 is a cross-sectional view taken on line 14—14 of FIG. 3.
FIG. 14A is a fragment, on enlarged scale, of the structure shown in FIG. 14.
FIGS. 15 and 16 are cross-sectional views taken respectively on lines 15—15 and 16—16 of FIG. 3.
FIG. 17 is a fragmentary sectional view of a detail of a typical actuating cylinder.

Seated in the exterior faces of slips 37 is an annular segmented chill ring 50, constructed of copper or other highly heat-conductive material. As best seen in FIGS. 14 and 14A, in which the thickness dimensions of the chill ring are greatly exaggerated for purposes of illustration, the chill ring consists of three concentric segmented rings of copper sheet, numbered 50a, 50b and 50c. The segments overlap and are secured to the slips and to each other in a manner, illustrated in the drawing, such that the chill ring will be caused to circumferentially expand and retract in accordance with the radial extension and retraction of the supporting slips while presenting a continuous chill ring surface about the slips which is substantially flush with the exterior faces thereof.

Anchor assembly C includes an annular expander 51 secured about the exterior of body 10 below expander assembly B having a downwardly and inwardly tapering, generally conical surface 52. A plurality of angularly spaced pipe-gripping slips 53 is arranged about expander 51 and unlike aligning slips 20 and 35, slips 53 have toothed external faces 54 and tapered inner faces 55 cooperating with expander surface 52 to produce radial extension and retraction of the slips in response to longitudinal movement thereof relative to expander 35.

Slips 53 are mounted for limited radial movement in an annular cage 56 provided with an inwardly turned retainer lip 57 receivable in grooves 57a for connecting the slips to the cage while cooperating with the slips to permit the necessary extent of radially movement thereof.

A plurality of vertically disposed angularly spaced cylinders 58 is fixedly mounted about the exterior of body 10 beneath cage 56, each cylinder being provided with a piston 59 attached to a piston rod 60 which extends through the upper end of cylinder 58 and is secured to cage 56. As in the other assemblies, reciprocation of pistons 59 will raise and lower cage 56 whereby to move slips 53, respectively, into and out of expansive engagement with expander 51.

Each of cylinders 58 is provided with upper and lower ports 61 and 62, respectively, on opposite sides of piston 59 to function alternately as inlet and outlet ports for pressure fluid supplied through respective header branch pipes 63 and 64. Branch pipes 63 are connected to conduit 32 while branch pipes 64 are connected to a valved conduit 65 disposed in bore 11 and extending to the exterior thereof through cap 12.

Pressure testing assembly D includes a tubular extension sleeve 70 secured to the lower end of body 10, the actual connection being made for convenience about the lower ends of cylinders 58. Sleeve 70 has mounted about the outer periphery thereof longitudinally spaced upper and lower seal elements 71—71 of any suitable and generally well known form, disposed and dimensioned to sealingly engage the surrounding wall of a liner casing P when fluid pressure is exerted in the annular space 72 defined between seal elements 71—71 and related portions of casing P.

Extension sleeve 70 is provided with longitudinally spaced upper and lower ports 73 and 74, respectively, communicating with annular space 72 and connected respectively to valved conduits 75 and 76 extending upwardly in bore 11 through cap 12. A bottom plate 77 is connected across the lower end of extension sleeve 70.

Second anchor assembly E includes a tubular body 80 having a top plate 81 closing the upper end thereof. An annular expander 82 is secured about the upper end of body 80 and has a downwardly and inwardly tapering conical surface 83 about which is arranged a plurality of angularly spaced slips 84 having toothed external faces 85 and tapering inner faces 86 cooperating with expander surface 83 to produce radial extension and retraction of the slips in response to longitudinal movement thereof relative to expander 82. The set of slips 84 is mounted for limited radial movement in an annular cage 87 provided with an inwardly turned retainer lip 88 receivable in cooperating grooves 88a in the slip shanks for connecting the slips to the cage while cooperating with the slips to permit the necessary degree of radial movement thereof. A plurality of angularly spaced, vertically disposed cylinders 89 are fixedly mounted about the exterior of body 80 beneath cage 87, each cylinder being provided with a piston 90 attached to a piston rod 91 which extends through the upper end of the cylinder and is secured to cage 87. As in the other assemblies, reciprocation of pistons 90 will raise and lower cage 87 whereby to move slips 84 into and out of expansive engagement with expander 84.

Each cylinder 89 is provided with upper and lower ports 92 and 93, respectively, on opposite sides of piston 90 to function alternately as inlet and outlet ports for pressure fluid supplied via the respective header branch pipes 94a and 95a through the respective valved conduits 94 and 95 which extend through plates 81 and 77 and thence upwardly through cap 12 to the exterior of the tool. Conduits 94 and 95 are provided with extensible coupling sections 96 and 97, respectively, of appropriate length and design to accommodate longitudinal movement of body 80 and assembly E relative to body 10 and its supported structure, for purposes to be more fully described hereinafter.

Mounted centrally on the upper face of plate 77 is an elongate cylinder 98 closed at its upper end by a head 99. A piston 100 is mounted for reciprocation in cylinder 98 and is connected to a piston rod 101 which extends slidably downwardly through plate 77 and is secured to plate 81 and thereby to body 80 and second anchor assembly E. Cylinder 98 is provided with upper and lower ports 102 and 103, respectively, on opposite sides of piston 100 to function alternately as inlet and outlet ports for pressure fluid supplied through the respective valved conduits 104 and 105 which extend in bore 11 through cap 12 to the exterior of the tool. Cylinder 98 and piston 100 are arranged to function as a hydraulic jack cooperating with the upper and lower anchor assemblies for raising and lowering the tool inside the casing for purposes to be described subsequently.

Figure 1:
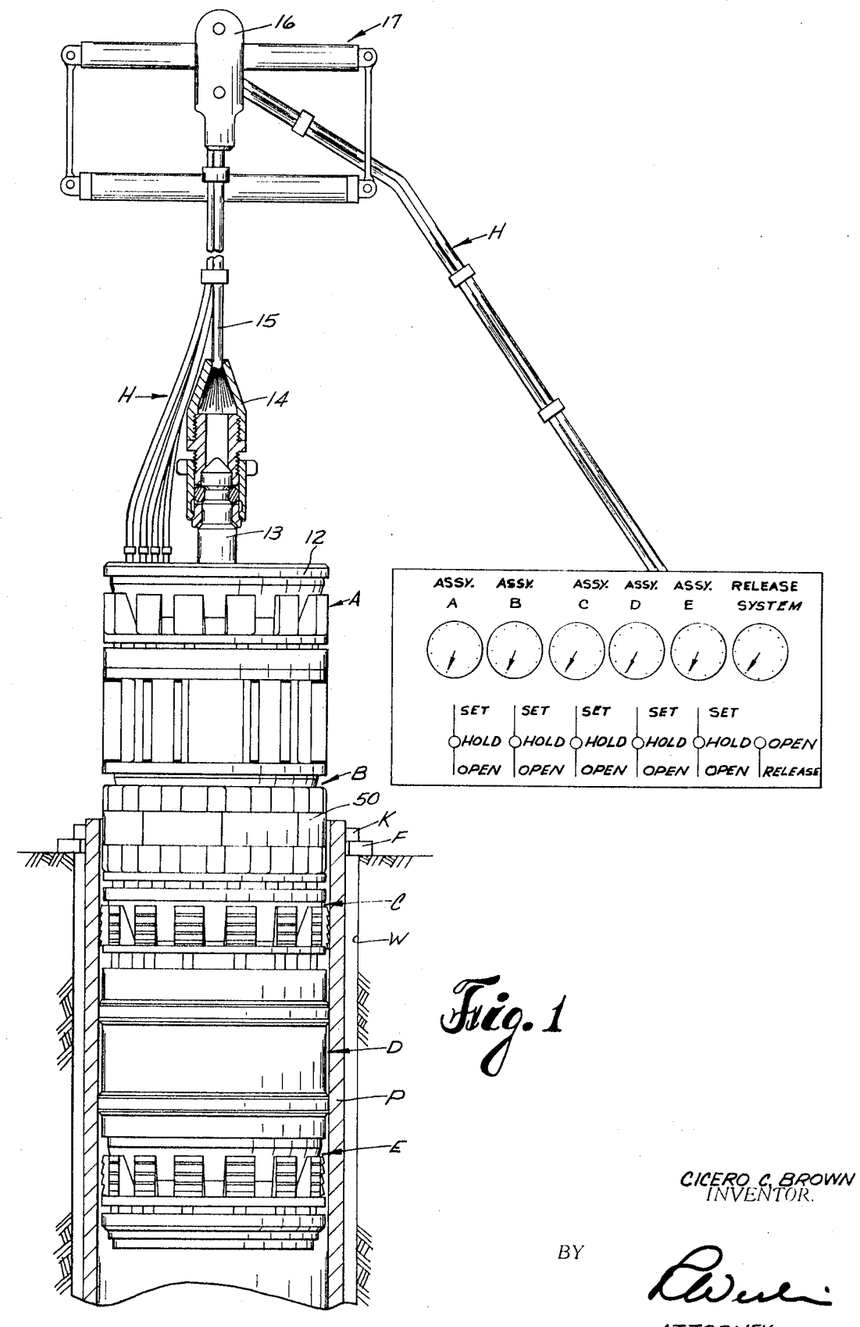
FIG. 1 is an elevational view of the tool inserted in the upper end of a string of casing in place in a bore hole.
Figure 2:
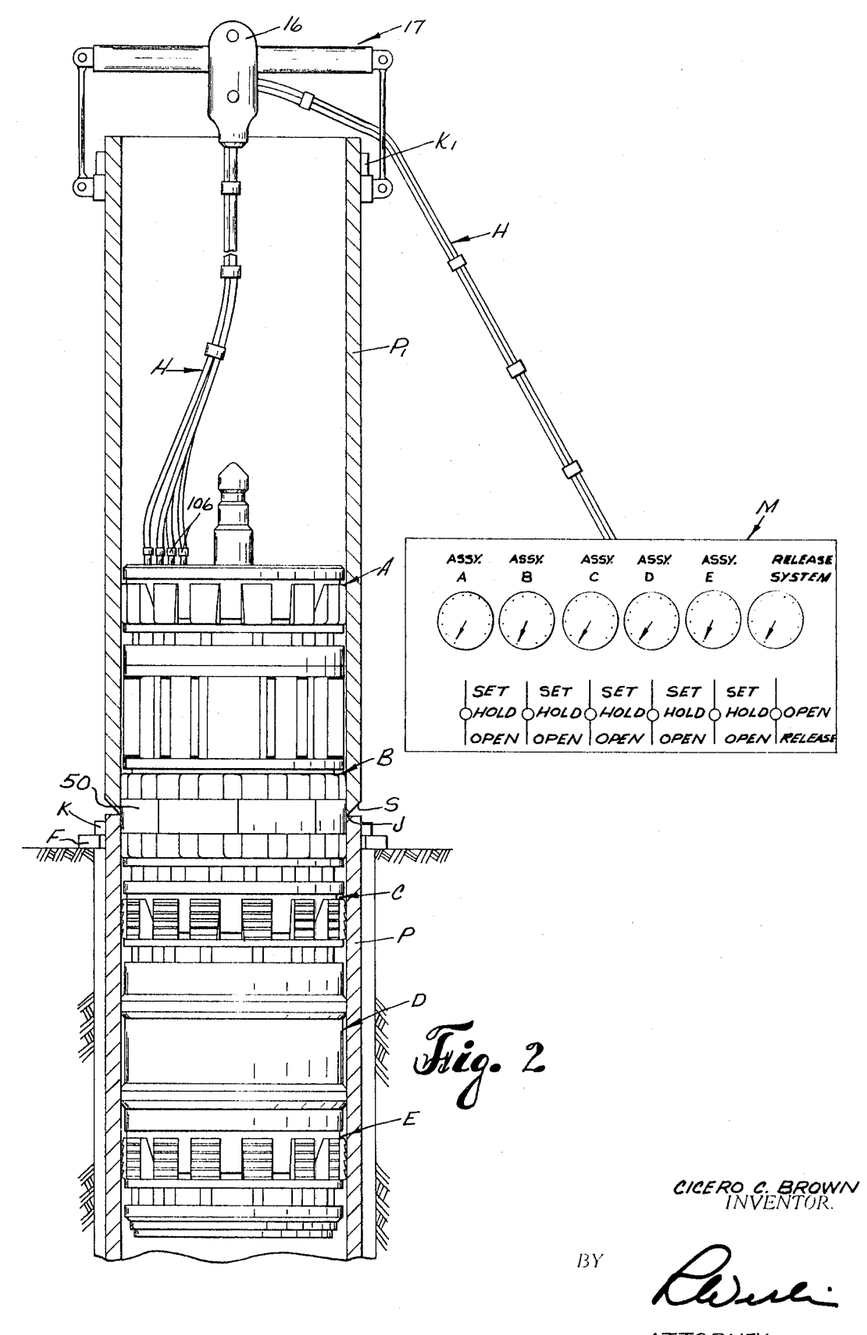
FIG. 2 is a view similar to FIG. 1, showing a casing section emplaced over the tool in position to be welded to the string in the bore hole.

The upper ends of the several valved conduits projecting above cap 12 are provided with conventional connectors 106 (FIG. 2) for releasably connecting the several conduits to flexible supply pipes, designated collectively by the letter H(FIGS. 1 and 2). The supply pipes H are suitably supported on block 16 and extend to a supply manifold and operating console, designated generally by the letter M, by means of which pressure fluid may be selectively directed into and vented from any of the several valved conduits, as required in the course of operation of the tool and as will be described hereinafter.

It will be understood that the manifold and operating console arrangement may be of any suitable and well known construction to enable the selective movement of pressure fluid to and from the various assemblies, as required, and the details thereof do not form a part of this invention.

OPERATION OF THE TOOL

Figure 5:
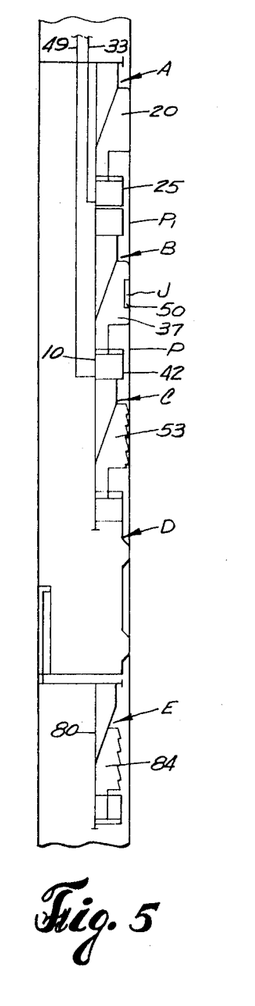

As seen in FIG. 1 and diagrammatically in FIG. 4, the tool is shown in place in the upper end of a casing section P, which constitutes the upper end of the casing string already in place in the well bore W and supported on a foundation block F disposed on the surface of the earth by means of cleats K secured about the exterior of the casing section adjacent its upper end. It may be assumed for purposes of this description, that in the position illustrated in FIGS. 1 and 4, the lowering of the casing string with the uppermost section P in place has been completed and in position preparatory for the connection of another section to the casing string. At this stage, upper anchor assembly C will be in its expanded position, anchoring the tool to casing section P, while lower anchor assembly E will be retracted as are aligning assemblies A and B. In order to hold slips 53 in their expanded engaged position, fluid will have been supplied to cylinder 58 through conduit 65 and the valves in these conduits shut off to retain the pressure in the cylinders. Thereupon, the group of supply pipes H will be disconnected from the several conduits and overshot 14 released from neck 13. Hoisting frame 17 may then be elevated and placed about the upper end of a section P$_1$(FIG. 2), to be attached to the upper end of casing section P. As illustrated, section P$_1$ is provided with the exterior cleats K$_1$ by means of which the section may be suspended in hoist frame 17. When section P$_1$ is in place in the hoist frame, the group of supply pipes H will be dropped through the bore thereof and reconnected to the several valved conduits, whereupon section P$_1$ will be lowered over the upper end of the tool until the scarfed lower end S of section P$_1$ is in abutting relation to the upper end of casing P. Pressure fluid will now be supplied through pipes 33 and 49 to the respective cylinders 25 and 42 to actuate the respective sets of aligning slips moving them upwardly and outwardly over the respective expanders 18 and 34(FIG. 5). Any fluid above the respective pistons will be evacuated through conduits 32. In this position of the tool, as illustrated, it will be seen that upper aligning assembly A, particularly slips 20, will be well above the joint J defined between the upper end of casing P and scarfed end S. Slips 37 of lower aligning assembly B will be positioned across joint J so as to extend above and below joint J to span the same and to place chill ring 50 directly opposite the joint.

When the aligning slips of assemblies A and B are thus actuated, they will apply radial and circumferential pressure about the interior of the adjacent ends of the pipe defining joint J, so as to force these adjacent portions of the casing into substantially true roundness and in concentric alignment with each other at the joint. Welding of the joint may now be accomplished in any conventional manner.

At the time the tool is positioned for purposes of alignment and completing the welding of the joint, lower anchor assembly E will be in the released condition, as seen in FIGS. 1, 4 and 5, and body 80 carrying anchor assembly E will be in its upwardly retracted position relative to testing assembly D and the main body of the tool.

Anchor assemblies C and E may now be operated cooperatively through hydraulic jacking procedures to raise the entire tool inside the casing to position it either for pressure testing the welded joints or for raising the tool to the initial position seen in FIGS. 1 and 2 preparatory to connection of another section of casing. By employing such procedures, the hoisting mechanism is relieved of much of the large loads constituted by the necessarily massive construction of the tool. FIGS. 6 to 13 illustrate stages in such operations of the tool.

To use the tool for pressure testing the weld at joint J, starting with the parts in the positions in FIG. 5, both aligning assemblies and upper anchor assembly C are in set position while anchor assembly E is in the unset or retracted position both with respect to the casing and with respect to the main body of the tool.

Figure 6:
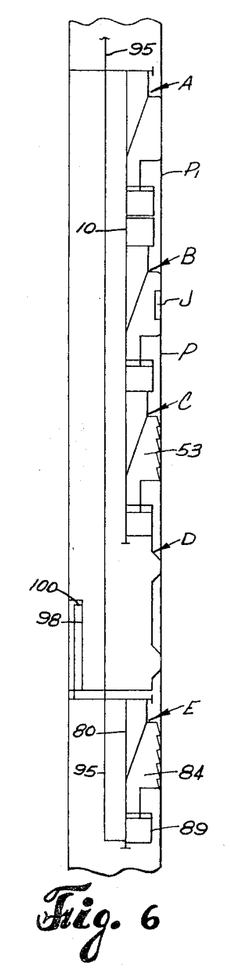
Figure 7:
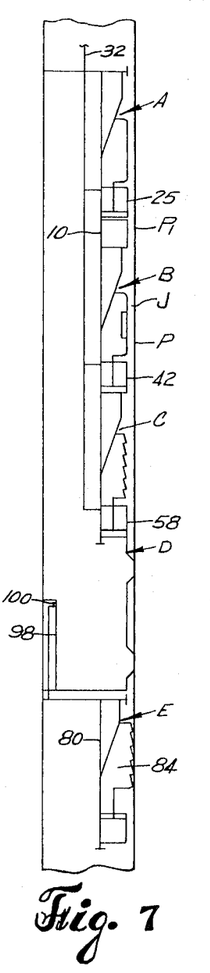
Figure 8:
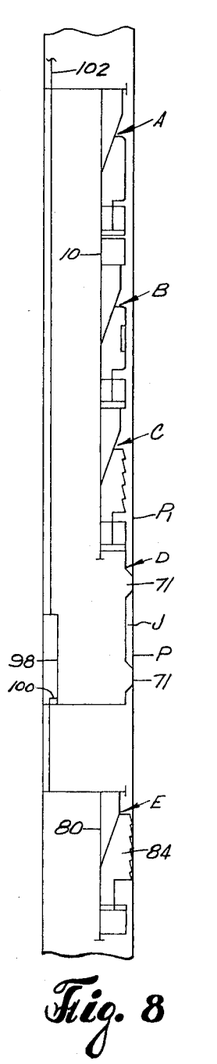
Figure 9:
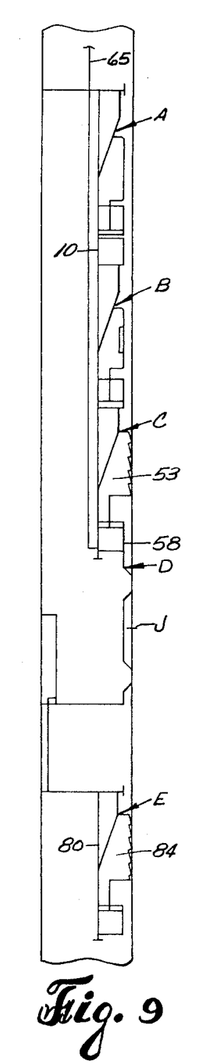
Figure 10:
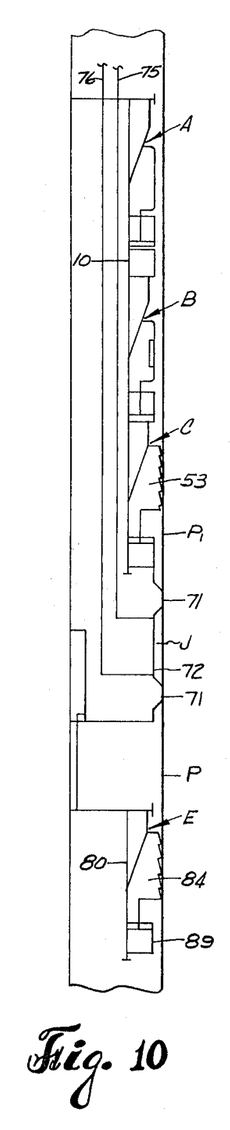
Figures 11, 12:
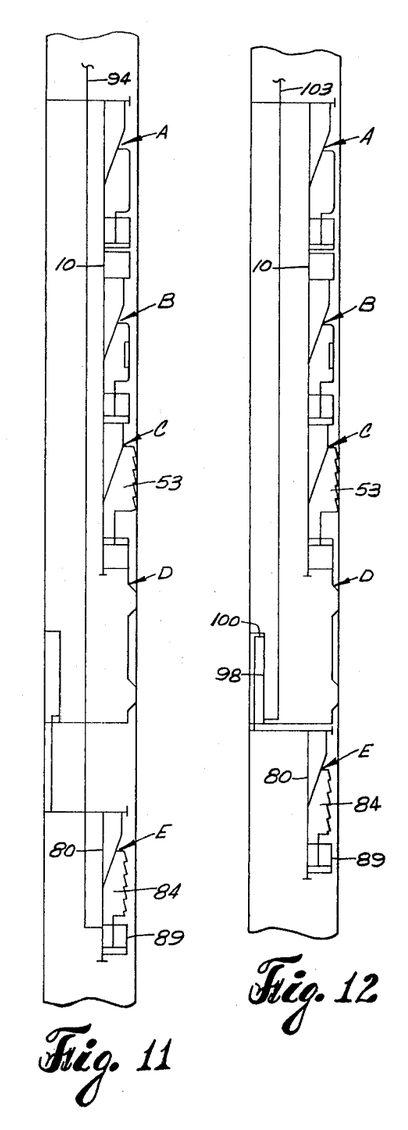
Figure 13:
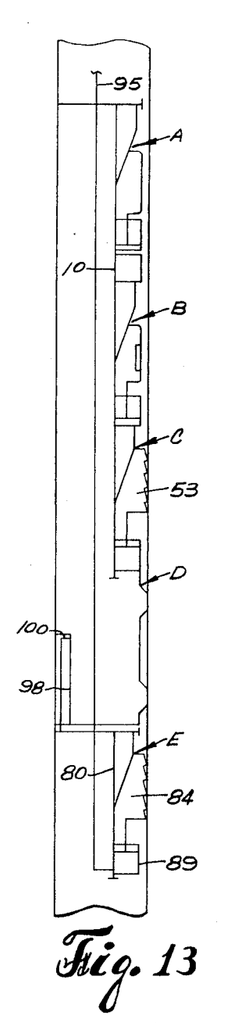

Fluid pressure will now be applied through conduit 95 to actuate slips 84 so as to move them into gripping engagement with casing P(FIG. 6). With the lower anchor assembly E now set, pressure is relieved from both aligning assemblies A and B and upper anchor assembly C by venting the pressure from their respective sets of cylinders through the common conduit 32 (FIG. 7). Fluid pressure will now be applied through conduit 102 into cylinder 98 above piston 100 (FIG. 8). Since the latter is now secured to casing P by means of the slips 84, the pressure in cylinder 98 will raise the entire main body of the tool, including testing assembly D, upwardly in the casing for the full length of the stroke of piston 100 which, for the purpose of this description, it will be assumed is sufficient to position seal elements 71,71 on opposite sides of joint J(FIG. 8). Pressure fluid will now be re-applied through conduit 65 to the actuating cylinders of upper anchor assembly C, actuating slips 53 into pipe-gripping engagement with casing P$_1$(FIG. 9), so that the tool is now effectively anchored to the casing on opposite sides of joint J. Pressure fluid for testing joint J will now be introduced into annular space 72 between the seal elements via either of conduits 75 or 76, whichever may be selected as the inlet conduit for this purpose, the other being shut-off in order to allow the pressure to build up inside annular space 72 between the seal elements and thereby apply the desired testing pressure to joint J, as illustrated in FIG. 10.

When testing of the weld has been completed, the pressure fluid is vented from annular space 72 and operations are continued in order to raise the entire tool to the upper end of section P$_1$ to the position shown in FIG. 1 preparatory to the addition of another section of the casing. This raising operation employs the hydraulic jacking elements, as illustrated particularly in FIGS. 11, 12 and 13. First, pressure is relieved from lower anchor assembly E through conduit 94, allowing retraction of slips 84 while actuating pressure is maintained on upper anchor assembly C to hold slips 53 in casing-gripping engagement. With lower anchor assembly E released, fluid pressure is now directed into cylinder 98 under piston 100 through conduit 103 to raise body 80 carrying the now released anchor assembly E upwardly relative to the main body of the tool (FIG. 12) to the same position as seen in FIG. 4. In the next stage, shown in FIG. 13, hydraulic pressure is reapplied through conduit 95 to cylinders 89 of lower anchor assembly E to reset slips 84 in the casing. When that is done, the pressure may be relieved from upper anchor assembly C to release slips 53 for return to the position shown in FIG. 8, whereupon pressure fluid may again be applied to cylinder 98 as in FIG. 8 to raise the main body of the tool by a length corresponding to a stroke of piston 100. This sequence of operations may then be repeated until the upper portion of the tool has been returned to the initial position illustrated in FIG. 1 preparatory to the installation of the next section of casing, in the manner previously described.

As will be evident, manifold or console M will be arranged in a known manner so that by appropriate manipulation of the controls employed therein the operator may selectively direct pressure fluid to and from the various assemblies in any desired sequence required for actuating the aligning assemblies and the anchor and pressure testing assemblies to accomplish the several functions heretofore described.

It will be evident from the foregoing that the tool may be made to function entirely satisfactorily as a welding mandrel, employing only aligning assemblies A and B and upper anchor assembly C. This is particularly the case where it may be found unnecessary to pressure test the welds and where it may be found unnecessary or undesirable to employ the hydraulic jacking pressure to move the tool inside the casing. However, both the pressure testing assembly and the lower anchor assembly will generally be found to be highly useful as a part of the complete tool.

It will be evident that various modifications and alterations may be made in the details of the illustrative embodiment within the scope of the appended claims but without departing from the spirit of this invention.

What I claim and desire to secure by Letters Patent is:

1. A centralizing mandrel for use in welding large diameter casing, comprising:
   a. a tubular support member insertible in a casing across a joint to be welded;
   b. a first annularly expansible aligning assembly mounted on said support member for movement into and out of expansive engagement with the adjacent portions of the casing sections defining said joint;
   c. a second annularly expansible aligning assembly mounted on said support member for movement into and out of expansive engagement with the casing section on one side of said joint at a point longitudinally spaced from said joint, said assemblies cooperating when expanded to coaxially align said casing portions in concentric substantially flush relation;
   d. a radially expansible anchor assembly mounted on said support member for movement into and out of anchoring engagement with the casing section on the opposite side of said joint; and
   e. fluid pressure-operated means for selectively actuating the several assemblies.

2. A mandrel according to claim 1 including a segmented chill ring mounted about said first aligning assembly movable thereby into concentric registration with said joint upon expansion of said aligning assembly.

3. A mandrel according to claim 1, including a pressure-testing assembly carried by said support member below said anchor assembly, said testing assembly comprising:
   a. a tubular sleeve;
   b. longitudinally spaced annular expansible seal elements mounted about said sleeve for sealing engagement with the surrounding casing and defining therewith a pressure chamber; and
   c. means for introducing pressure fluid into said chamber for actuating said seal elements.

4. A mandrel according to claim 3, including a segmented chill ring mounted about said first aligning assembly movable thereby into concentric registration with said joint upon expansion of said aligning assembly.

5. A mandrel as defined in claim 1, including:
   a. a second radially expansible anchor assembly mounted on a second tubular support member for movement into and out of anchoring engagement with the surrounding casing at a point spaced from said first anchor assembly;
   b. fluid pressure-actuated jack means connecting said first and second support members for relative axial movement; and
   c. said fluid pressure-operated means including means for selectively actuating said second anchor assembly and said jack means in cooperation with said first anchor assembly whereby to enable movement of said mandrel longitudinally in said casing.

6. A mandrel as defined in claim 5, including a segmented chill ring mounted about said first aligning assembly movable thereby into concentric registration with said joint upon expansion of said first aligning assembly.

7. A mandrel according to claim 5, including a pressure-testing assembly carried by said support member between said anchor assemblies, said testing assembly comprising:
   a. a tubular sleeve secured to said support member;
   b. longitudinally spaced annular expansible seal elements mounted about said sleeve for sealing engagement with the surrounding casing and defining therewith a pressure-confining chamber; and
   c. means for introducing pressure fluid into said chamber,
   d. said testing assembly being movable with said mandrel by said cooperation between said anchor and jacking assemblies to a position spanning said joint.

8. A mandrel according to claim 1, wherein each of said aligning assemblies comprises:
   a. an expander ring;
   b. a plurality of angularly spaced slips having substantially smooth casing-engaging faces disposed about said expander ring for radial expansion and contraction in response to longitudinal movement relative to said expander ring; and
   c. fluid pressure-actuated means for effecting said longitudinal movement.

9. A mandrel according to claim 5, wherein each of said aligning assemblies comprises:
   a. an expander ring;
   b. a plurality of angularly spaced slips having substantially smooth casing-engaging faces disposed about said expander ring for radial expansion and contraction in response to longitudinal movement relative to said expander; and
   c. fluid pressure-actuated means for effecting said longitudinal movement.

10. A centralizing mandrel for use in welding large diameter casing, comprising;
   a. a tubular support member insertible in a casing across a joint to be welded;
   b. a first annularly expansible aligning assembly mounted on said support member for movement into and out of expansive engagement with the adjacent portions of the casing sections defining said joint;
   c. a second annularly expansible aligning assembly mounted on said support member for movement into and out of expansive engagement with the casing section on one side of said joint at a point longitudinally spaced from said joint, said assemblies cooperating when expanded to coaxially align said casing portions in concentric substantially flush relation;
   d. a first radially expansible anchor assembly mounted on said support member for movement into and out of anchoring engagement with the casing section on the opposite side of said joint;
   c. a pressure testing assembly carried by the support member below said first anchor assembly and carrying means for sealing off between the support member and the casing at points above and below said joint when positioned opposite the joint;
   f. a second radially expansible anchor assembly mounted on a second tubular support member for movement into and out of anchoring engagement with the surrounding casing at a point spaced from said first-mentioned anchor assembly and below said testing assembly;
   g. a fluid pressure actuated jack assembly connecting said first and second support members for relative axial movement; and
   h. fluid pressure-operated means for selectively actuating the several assemblies in a predetermined order.

* * * * *